United States Patent
Yoshimura

(10) Patent No.: US 11,902,717 B2
(45) Date of Patent: Feb. 13, 2024

(54) PROJECTION METHOD AND PROJECTOR

(71) Applicant: SEIKO EPSON CORPORATION, Tokyo (JP)

(72) Inventor: Jun Yoshimura, Beppu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/536,769

(22) Filed: Nov. 29, 2021

(65) Prior Publication Data

US 2022/0174247 A1 Jun. 2, 2022

(30) Foreign Application Priority Data

Nov. 30, 2020 (JP) ................................ 2020-198676

(51) Int. Cl.
  *H04N 9/31* (2006.01)
  *G01B 11/02* (2006.01)

(52) U.S. Cl.
  CPC ......... *H04N 9/3182* (2013.01); *G01B 11/026* (2013.01); *H04N 9/3185* (2013.01)

(58) Field of Classification Search
  CPC .. H04N 5/74; H04N 5/408; H04N 9/31–3182; H04N 9/3194; H04N 9/3185; H04N 9/3188; H04N 13/30; H04N 13/324; H04N 13/363; G03B 21/14; G03B 21/2006; G03B 21/2013; G03B 21/202;
(Continued)

(56) References Cited

U.S. PATENT DOCUMENTS

2006/0187184 A1* 8/2006 Miyasaka ............ H04N 9/3194
  345/104
2010/0103386 A1* 4/2010 Kubota ................ H04N 9/3185
  353/121
(Continued)

FOREIGN PATENT DOCUMENTS

BR 102013033971 A2 * 11/2015 ............. G06T 3/005
JP 2005348379 A * 12/2005
(Continued)

OTHER PUBLICATIONS

Naked, "Experience an Artistic Summer with Projection Mapping! Summary of events in Tokyo," 2017, pp. 1-11.
(Continued)

*Primary Examiner* — John W Miller
*Assistant Examiner* — Humam M Satti
(74) *Attorney, Agent, or Firm* — Oliff PLC

(57) ABSTRACT

A projection method includes detecting a first distance between a projector and a first portion of a projection surface, detecting a second distance between the projector and a second portion of the projection surface, detecting a third distance between the projector and a third portion of the projection surface, projecting image light in a first visual aspect according to the first distance onto the first portion by using the projector, projecting image light in a second visual aspect according to the second distance onto the second portion by using the projector, and projecting image light in a third visual aspect based on the first and second visual aspects onto the third portion by using the projector when the third distance is longer than the first distance but shorter than the second distance.

10 Claims, 8 Drawing Sheets

(58) Field of Classification Search
CPC ............ G03B 21/2026; G03B 21/2033; G03B 21/204; G03B 21/2046; G03B 21/2053; G03B 21/206; G01B 11/026; G01B 17/00
See application file for complete search history.

(56) References Cited

U.S. PATENT DOCUMENTS

| | | |
|---|---|---|
| 2014/0118705 A1 | 5/2014 | Hasegawa et al. |
| 2017/0264871 A1* | 9/2017 | Fujiune .................... H04N 9/28 |
| 2018/0091784 A1* | 3/2018 | Dutton ................... H04N 9/315 |
| 2020/0193568 A1* | 6/2020 | Aoyanagi ............. G03B 21/142 |
| 2020/0310230 A1* | 10/2020 | Liu ........................ H04N 9/315 |
| 2023/0252193 A1* | 8/2023 | Morrison .............. G06F 1/1656 |
| | | 726/34 |

FOREIGN PATENT DOCUMENTS

| | | |
|---|---|---|
| JP | 2010-086928 A | 4/2010 |
| JP | 2013-033206 A | 2/2013 |
| JP | 2015-031018 A | 2/2015 |
| JP | 2020-014075 A | 1/2020 |
| JP | 2020-077059 A | 5/2020 |

OTHER PUBLICATIONS

"What are glittering in seven colors on winter nights . . . Dried daikon radishes, lit up in Miyazaki Pref.," 2020, Japan.

* cited by examiner

PROJECTION METHOD AND PROJECTOR

The present application is based on, and claims priority from JP Application Serial Number 2020-198676, filed Nov. 30, 2020, the disclosure of which is hereby incorporated by reference herein in its entirety.

BACKGROUND

1. Technical Field

The present disclosure relates to a projection method and a projector.

2. Related Art

Technologies for projecting a variety of images by using a projector have been disclosed.

For example, the image projection system described in JP-A-2020-14075 includes a depth camera that three-dimensionally recognizes the area of a target object present in front of the background on which an image is projected and a projector that outputs predetermined data to the recognized area or an area outside the recognized area.

The image projection system described in JP-A-2020-14075, however, has room for a higher degree of freedom of the image projected on the projection surface.

SUMMARY

A projection method according to an aspect of the present application example includes detecting a first distance between a projector and a first portion of a projection surface, detecting a second distance between the projector and a second portion of the projection surface, detecting a third distance between the projector and a third portion of the projection surface, causing the projector to project image light in a first visual aspect according to the first distance onto the first portion, causing the projector to project the image light in a second visual aspect according to the second distance onto the second portion, and causing the projector to project the image light in a third visual aspect based on the first and second visual aspects onto the third portion when the third distance is longer than the first distance but shorter than the second distance.

A projector according to another aspect of the present application example includes a light source, a light modulator that modulates light outputted from the light source, a distance sensor, and at least one processor, and the at least one processor detects a first distance between the projector and a first portion of a projection surface by using the distance sensor, detects a second distance between the projector and a second portion of the projection surface by using the distance sensor, detects a third distance between the projector and a third portion of the projection surface by using the distance sensor, projects image light in a first visual aspect according to the first distance onto the first portion by using the light source and the light modulator, projects the image light in a second visual aspect according to the second distance onto the second portion by using the light source and the light modulator, and projects the image light in a third visual aspect based on the first and second visual aspects onto the third portion by using the light source and the light modulator when the third distance is longer than the first distance but shorter than the second distance.

DESCRIPTION OF EXEMPLARY EMBODIMENTS

An embodiment will be described below with reference to the drawings.

A projection image projected on a projection surface PS by a projector 200 according to the present embodiment will first be described with reference to FIG. 1.

Figure 1:
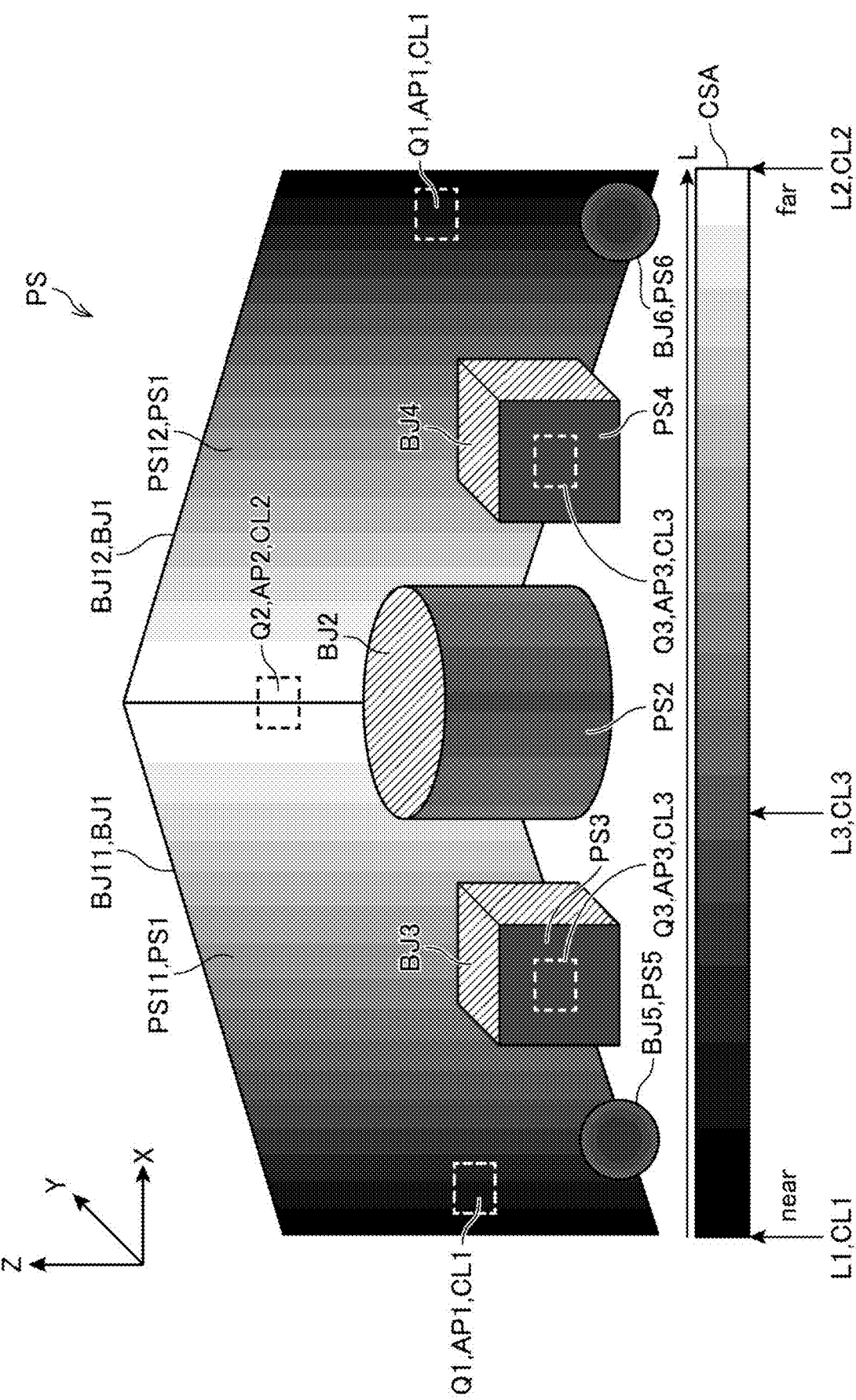
FIG. 1 is a perspective view showing an example of a projection image according to an embodiment of the present disclosure.

FIG. 1 shows axes X, Y, and Z perpendicular to one another. The axis Z is parallel to the vertical direction, and the axes X and Y are parallel to the horizontal direction. In FIG. 1, the projection surface PS is parallel to the axis Z. When viewed from a position facing the projection surface PS, the axis X represents the rightward-leftward direction, and the axis Y represents the frontward-backward direction. The positive direction of the axis X represents the rightward direction, the positive direction of the axis Z represents the upward direction, and the positive direction of the axis Y represents the forward direction.

The projector 200 is disposed in a position shifted in the negative direction of the axis Y from the projection surface PS. The configuration of the projector 200 will be described with reference to FIG. 2. The arrangement of the projector 200 will be described with reference to FIG. 3.

FIG. 1 is a perspective view showing an example of a projection image according to the present embodiment.

The projection surface PS includes a first projection surface PS1, a second projection surface PS2, a third projection surface PS3, a fourth projection surface PS4, a fifth projection surface PS5, and a sixth projection surface PS6.

Image light PL from the projector 200 is projected toward the first projection surface PS1 to the sixth projection surface PS6, and the projection image is displayed on the first projection surface PS1 to the sixth projection surface PS6.

The first projection surface PS1 is a surface of a first object BJ1 that is the surface facing in the negative direction of the axis Y.

The first object BJ1 is formed of a first member BJ11 and a second member BJ12. The first member BJ11 and the second member BJ12 are each a rectangular, planar-plate-shaped member. The right end of the first member BJ11 is joined to the left end of the second member BJ12. The first member BJ11 and the second member BJ12 are symmetrically arranged with respect to a projection axis LC of the image light PL from the projector 200, as described with reference to FIG. 3.

The first projection surface PS1 is formed of a projection surface PS11 and a projection surface PS12. The projection surface PS11 is a surface of the first member BJ11 that is the surface facing in the negative direction of the axis Y. The projection surface PS12 is a surface of the second member BJ12 that is the surface facing in the negative direction of the axis Y.

The projection surface PS11 is a planar surface parallel to the axis Z and is disposed so as to incline with respect to the plane XZ in such a way that the right side of the projection surface PS11 is separate away from the plane XZ. The projection surface PS12 is a planar surface parallel to the axis Z and is disposed so as to incline with respect to the plane XZ in such a way that the left side of the projection surface PS12 is separate away from the plane XZ.

The first projection surface PS1 includes first portions Q1 and a second portion Q2.

The first portions Q1 are disposed in the position of the left end and the position of the right end of the first projection surface PS1. A distance L between the first portions Q1 and the projector 200 is a first distance L1. The second portion Q2 is disposed in the position of the center of the first projection surface PS1 in the rightward-leftward direction. The distance L between the second portion Q2 and the projector 200 is a second distance L2.

The distance L will be described with reference to FIG. 3.

The second projection surface PS2 is a surface of a second object BJ2 that is the surface facing in the negative direction of the axis Y.

The second object BJ2 has a columnar shape and is so disposed that the center axis thereof is parallel to the axis Z. The second object BJ2 is disposed in a position shifted in the negative direction of the axis Y from the first object BJ1.

The third projection surface PS3 is a surface of a third object BJ3 that is the surface facing in the negative direction of the axis Y. The fourth projection surface PS4 is a surface of a fourth object BJ4 that is the surface facing in the negative direction of the axis Y.

The third object BJ3 and the fourth object BJ4 each have a cubic shape and are each so disposed that one of the six faces of the object faces the negative direction of the axis Y. The third object BJ3 and the fourth object BJ4 are disposed in positions shifted in the negative direction of the axis Y from the first object BJ1 and the second object BJ2.

The third projection surface PS3 and the fourth projection surface PS4 each include a third portion Q3. The distance L between the third portions Q3 and the projector 200 is a third distance L3.

The third distance L3 is longer than the first distance L1 but shorter than the second distance L2. The third portions Q3 and the third distance L3 in FIG. 1 are each presented as an example. The third distance L3 is the distance L to an arbitrary position in range of the projection surface PS between the position corresponding to the first distance L1 and the position corresponding to the second distance L2.

The fifth projection surface PS5 is a surface of a fifth object BJ5 that is the surface in facing in the negative direction of the axis Y. The sixth projection surface PS6 is a surface of a sixth object BJ6 that is the surface facing in the negative direction of the axis Y.

The fifth object BJ5 and the sixth object BJ6 each have a spherical shape. The fifth object BJ5 and the sixth object BJ6 are disposed in positions shifted in the negative direction of the axis Y from the first object BJ1 to the fourth object BJ4.

The lower part of FIG. 1 shows a first setting result display section CSA, which shows the relationship between the distance L and a visual aspect of the image light PL projected by the projector 200. The first setting result display section CSA is not an object disposed in the space where the projection surface PS is disposed but is shown in FIG. 1 for convenience of description. The first setting result display section CSA has a rectangular shape extending in the rightward-leftward direction. The rightward-leftward direction of the first setting result display section CSA represents the distance L, and the distance L increases in the rightward direction.

The position of the left end of the first setting result display section CSA corresponds to the first distance L1, and the position of the right end of the first setting result display section CSA corresponds to the second distance L2.

In FIG. 1, the first distance L1 corresponds to a first color CL1, and the second distance L2 corresponds to a second color CL2, as shown in the first setting result display section CSA. The third distance L3 corresponds to an intermediate color CL3 between the first color CL1 and the second color CL2. In FIG. 1, the first color CL1 is black, the second color CL2 is white, and the intermediate color CL3 is gray. The longer the distance L, the brighter the color, as shown in the first setting result display section CSA.

The first color CL1 corresponds to an example of a first visual aspect AP1. The second color CL2 corresponds to an example of a second visual aspect AP2. The intermediate color CL3 corresponds to an example of a third visual aspect AP3.

For example, when luminance B is expressed in 256 grayscales, a luminance value B1 of black corresponding to the first distance L1 is "0", and a luminance value B2 of white corresponding to the second distance L2 is "255". The luminance value B corresponding to the distance L is expressed by Expression (1) below.

$$B = ((L - L1)/(L2 - L1)) \times 255 \qquad (1)$$

For example, a luminance value B3 corresponding to the third distance L3 is expressed by Expression (2) below.

$$B3 = ((L3 - L1)/(L2 - L1)) \times 255 \qquad (2)$$

Since the visual aspect of the image light PL can be specified in accordance with the distance L, as shown in the first setting result display section CSA, a projection image having a higher degree of freedom can be displayed on the projection surface PS than, for example, when an image is displayed on a target object or an area other than the target object.

A method for setting the first setting result display section CSA will be described with reference to FIGS. 4 to 6.

Figure 2:
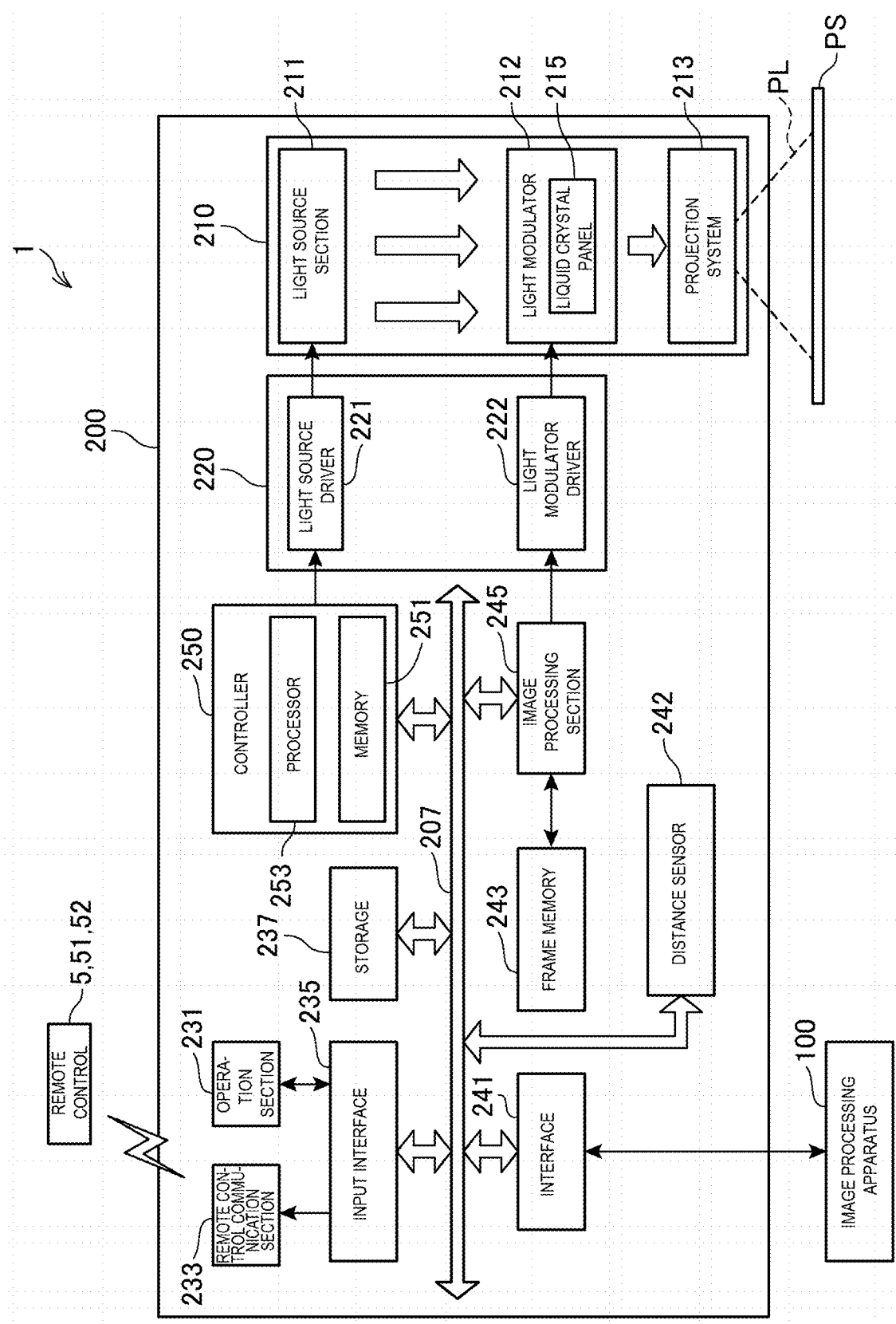
FIG. 2 shows an example of the configuration of a projector according to the present embodiment.

FIG. 2 shows an example of the configuration of the projector 200 according to the present embodiment. The projector 200 projects the image light PL toward the projection surface PS to display a projection image on the projection surface PS. In FIG. 2, the projection surface PS is shown in the form of a planar surface for convenience.

The projector 200 includes a projection section 210 and a driver 220, which drives the projection section 210, as shown in FIG. 2. The projection section 210 forms an optical image and projects the image on the projection surface PS. The projection section 210 includes a light source section 211, an optical modulator 212, and a projection system 213. The driver 220 includes a light source driver 221 and a light modulator driver 222.

The light source section 211 includes a light source. The light source section 211 includes, for example, a lamp light source, such as a halogen lamp, a xenon lamp, and an ultrahigh-pressure mercury lamp, or a solid-state light source, such as an LED (light emitting diode) and a laser light source.

The light source section 211 may include a reflector and an auxiliary reflector that guide the light outputted by the light source to the light modulator 212. The light source section 211 may further include, for example, the following optical elements for enhancing the optical characteristics of the projection light: a lens group; a polarizer; and a light adjusting element that is disposed in the path to the light modulator 212 and attenuates the amount of light outputted by the light source.

The light source driver 221 is coupled to an internal bus 207 and turns on and off the light source of the light source section 211 in accordance with an instruction from a controller 250 coupled to the internal bus 207.

The light modulator 212 includes, for example, three liquid crystal panels 215 corresponding to the three primary colors, R, G, and B. The characters R, G, and B represent red, green, and blue, respectively. That is, the light modulator 212 includes a liquid crystal panel 215 corresponding to the R light, a liquid crystal panel 215 corresponding to the G light, and a liquid crystal panel 215 corresponding to the B light.

The light outputted by the light source section 211 is separated into three types of color light or the R light, the G light, and the B light, which enter the liquid crystal panels 215 corresponding thereto. The three liquid crystal panels 215 are each a transmissive liquid crystal panel and each modulate the light passing therethrough to generate image light PL. The image light PL having passed through each of the liquid crystal panels 215 and having therefore been modulated is combined with the others by a light combining system, such as a cross dichroic prism, and the combined image light PL exits toward the projection system 213.

The present embodiment will be described with reference to the case where the light modulator 212 includes the transmissive liquid crystal panels 215 as light modulation devices, but not necessarily. The light modulation devices may each be a reflective liquid crystal panel or a digital micromirror device.

The light modulator 212 is driven by the light modulator driver 222. The light modulator driver 222 is coupled to an image processing section 245.

Image data corresponding to the RGB primary colors are inputted from the image processing section 245 to the light modulator driver 222. The optical modulator driver 222 can be formed, for example, of an integrated circuit. The light modulator driver 222 converts the inputted image data into data signals suitable for the action of the liquid crystal panels 215. The light modulator driver 222 applies voltage to each pixel of each of the liquid crystal panels 215 based on the data signals as a result of the conversion to draw an image in the liquid crystal panel 215.

The projection system 213 includes a lens, a mirror, and other components that bring the incident image light PL into focus on the projection surface PS. The projection system 213 may include, for example, a zoom mechanism that enlarges or reduces an image to be projected on the projection surface PS and a focus adjustment mechanism that performs focus adjustment.

The projector 200 further includes an operation section 231, a remote control communication section 233, an input interface 235, a storage 237, an interface 241, a distance sensor 242, a frame memory 243, the image processing section 245, and the controller 250. The input interface 235, the storage 237, the interface 241, the distance sensor 242, the image processing section 245, and the controller 250 are so coupled to each other via the internal bus 207 as to be capable of data communication.

The operation section 231 includes a variety of buttons or switches provided at the surface of an enclosure of the projector 200, generates an operation signal corresponding to operation performed on any of the buttons or switches, and outputs the generated operation signal to the input interface 235. The input interface 235 includes a circuit that outputs the operation signal inputted from the operation section 231 to the controller 250.

The remote control communication section 233 performs infrared communication or short-range wireless communication with a remote control 5. The remote control 5 includes a touch panel 51 and a variety of operation keys 52.

The touch panel 51 includes an LCD (liquid crystal display) and a touch sensor. The LCD displays a variety of images, including a display visual aspect setting screen 300, a display visual aspect setting screen 400, and a display visual aspect setting screen 500 shown in FIGS. 4 to 6.

The remote control 5 receives a communication signal from the remote control communication section 233, decodes the communication signal into an image signal, and displays an image corresponding to the image signal on the LCD of the touch panel 51.

The touch sensor is formed integrally with the display surface of the LCD and accepts user's touch operation. The operation keys 52 also accept the user's operation.

The remote control 5 encodes an operation signal corresponding to the operation received by the touch sensor of the touch panel 51 or any of the operation keys 52 into a communication signal and transmits the communication signal to the remote control communication section 233.

Figure 4:
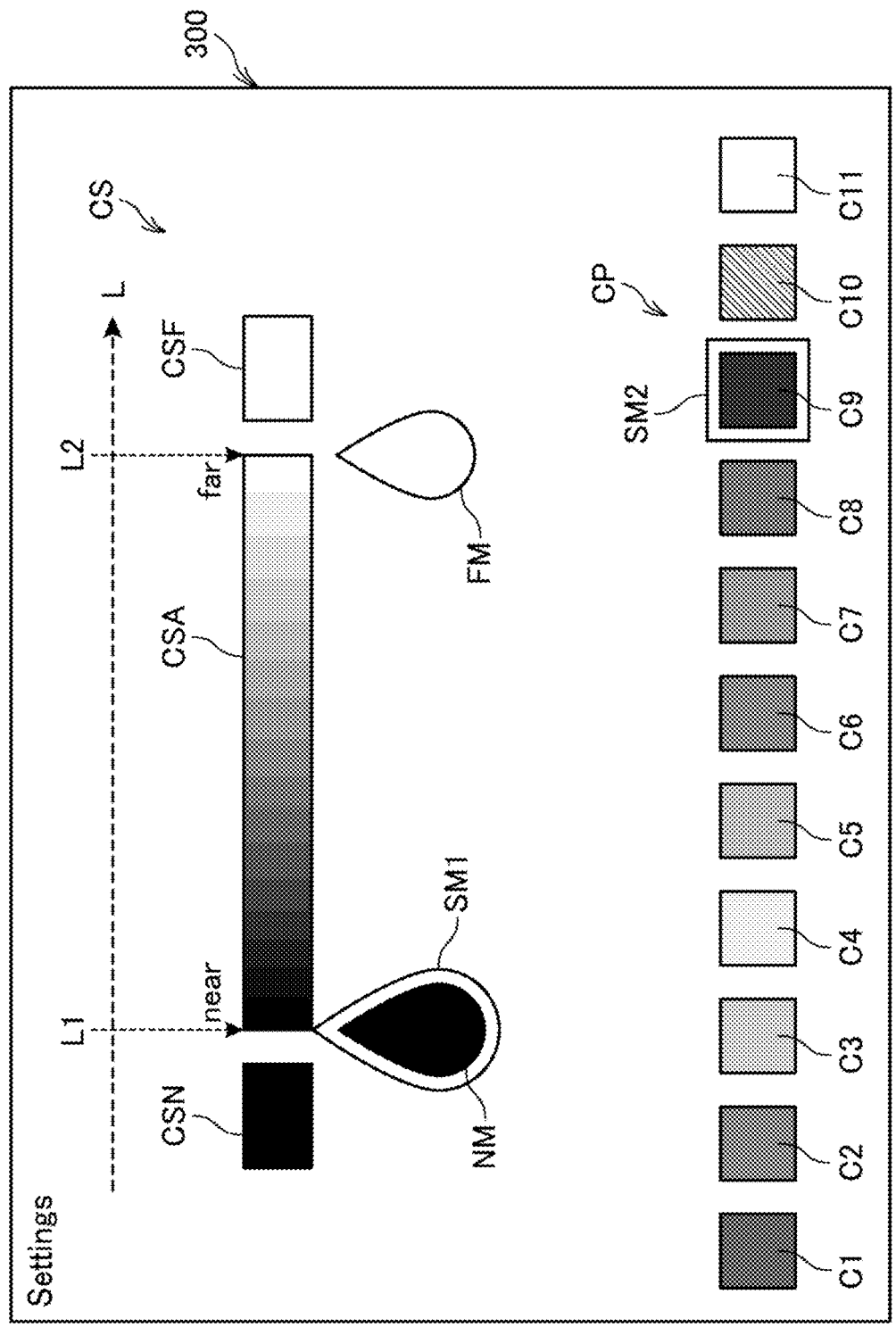
FIG. 4 is a screen diagram showing an example of a display visual aspect setting screen.
Figure 5:
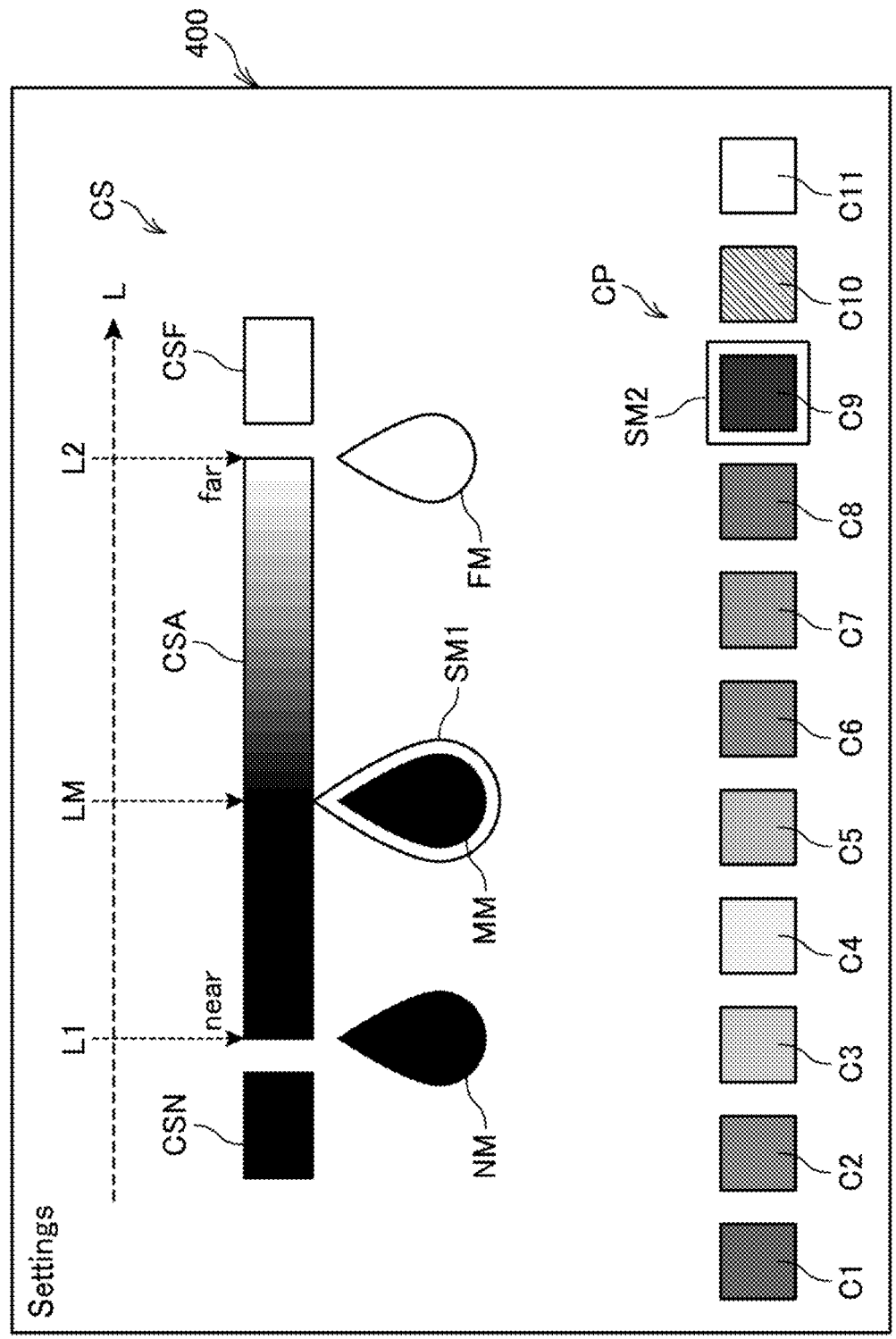
FIG. 5 is a screen view showing another example of the display visual aspect setting screen.
Figure 6:
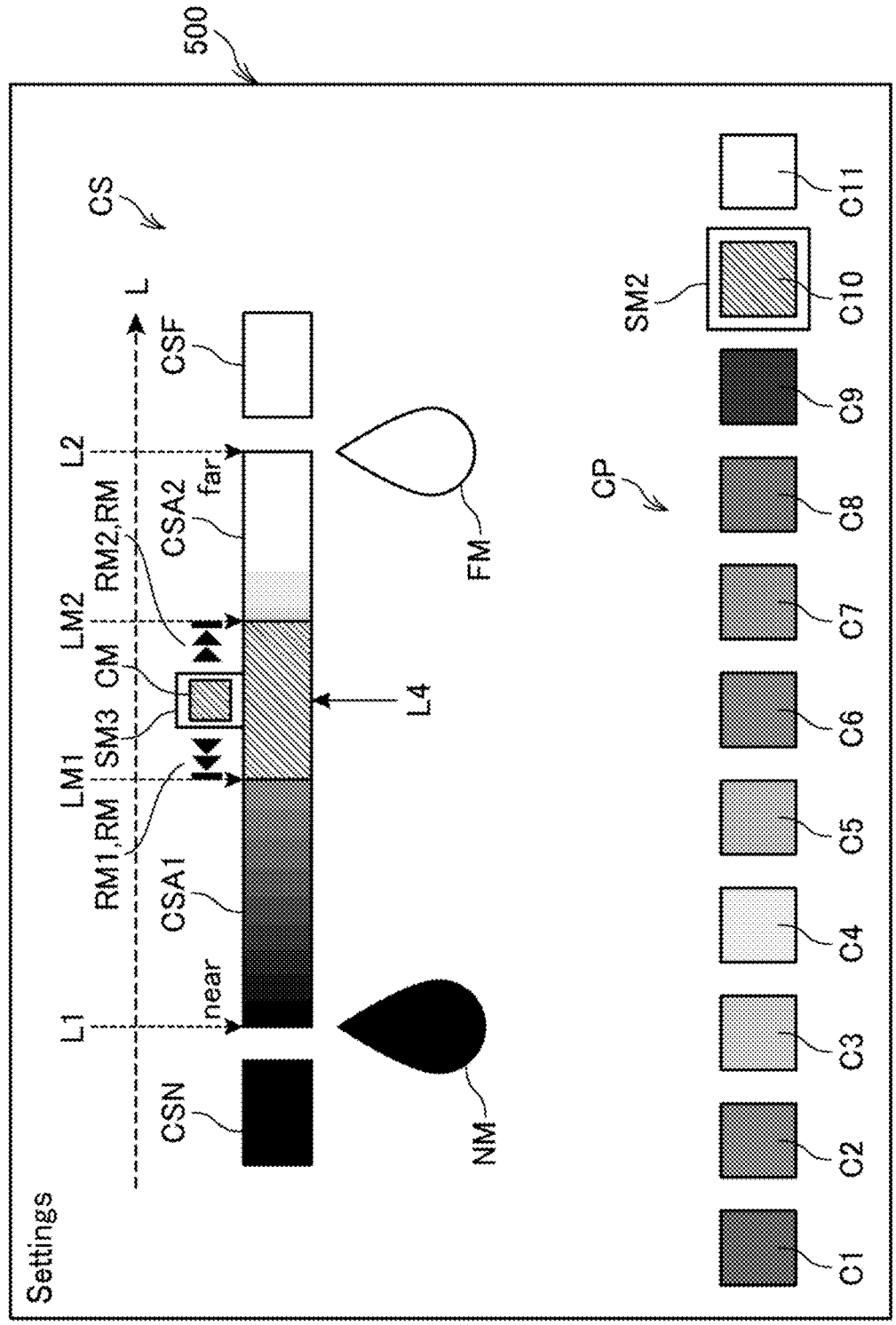
FIG. 6 is a screen view showing another example of the display visual aspect setting screen.

In the present embodiment, the remote control 5 displays a variety of images, including the display visual aspect setting screen 300, the display visual aspect setting screen 400, and the display visual aspect setting screen 500 shown in FIGS. 4 to 6, and the projector 200 accepts display visual aspect settings from the remote control 5, but not necessarily.

For example, an information processing apparatus 100 may display a variety of images, including the display visual aspect setting screen 300, the display visual aspect setting screen 400, and the display visual aspect setting screen 500 shown in FIGS. 4 to 6, and the projector 200 may accept display visual aspect settings from the information processing apparatus 100.

Still instead, for example, the operation section 231 may display a variety of images, including the display visual aspect setting screen 300, the display visual aspect setting screen 400, and the display visual aspect setting screen 500 shown in FIGS. 4 to 6, and the projector 200 may accept display visual aspect settings from the operation section 231.

The remote control communication section 233 receives an infrared signal transmitted from the remote control 5 and decodes the received infrared signal to generate an operation signal. The remote control communication section 233 outputs the generated operation signal to the input interface 235. The input interface 235 outputs the operation signal inputted from the remote control communication section 233 to the controller 250.

The remote control communication section 233 further transmits a variety of images to the remote control 5, for example, in accordance with instructions from the controller 250. The remote control communication section 233 encodes an image signal inputted from the controller 250 to generate an infrared signal. The remote control communication section 233 transmits the generated infrared signal to the remote control 5.

The storage 237 is, for example, a magnetic recording apparatus, such as an HDD (hard disk drive), or a storage apparatus using a semiconductor storage device, such as a flash memory. The storage 237 stores, for example, a program executed by the controller 250, data processed by the controller 250, and the image data.

The interface 241 is a communication interface that performs communication with the information processing apparatus 100 in accordance, for example, with the Ethernet (registered trademark) standard. The interface 241 includes a connector to which an Ethernet (registered trademark) cable is coupled and an interface circuit that processes a signal transmitted via the connector. The interface 241 is an interface substrate including the connector and the interface circuit and is coupled to a main substrate of the controller 250 that is a substrate on which a processor 253 and other components are mounted. The connector and the interface circuit that form the interface 241 are instead mounted on the main substrate of the controller 250. The interface 241 receives, for example, a variety of pieces of setting information and a variety of pieces of instruction information from the information processing apparatus 100.

The information processing apparatus 100 is formed, for example, of a personal computer and transmits the variety of pieces of setting information and the variety of pieces of instruction information to the projector 200.

An image display system 1 according to the present embodiment includes the information processor 100 and the projector 200.

The distance sensor 242 is, for example, an ultrasonic sensor. The distance sensor 242 detects a distance LA between the projector 200 and the projection surface PS. Specifically, the distance sensor 242 detects the distance LA between the distance sensor 242 and an arbitrary portion of the projection surface PS. The distance sensor 242 outputs information representing the detected distance LA to the controller 250.

The present embodiment is described with reference to the case where the distance sensor 242 is an ultrasonic sensor, but not necessarily. The distance sensor 242 may, for example, be an optical sensor (LiDAR: light detection and ranging) or a radio wave sensor (radar: radio detecting and ranging).

The image processing section 245 and the frame memory 243 can be formed, for example, of an integrated circuit. The integrated circuit includes an LSI (large scale integration), an ASIC (application specific integrated circuit), and a PLD (programmable logic device). The PLD includes, for example, an FPGA (field-programmable gate array). An analog circuit may form part of the configuration of the integrated circuit, or the combination of a processor and an integrated circuit may be used. The combination of a processor and an integrated circuit is called, for example, a microcontroller unit (MCU), an SoC (system-on-a-chip), a system LSI, and a chipset.

The image processing section 245 develops image data inputted via the interface 241 in the frame memory 243. The frame memory 243 includes a plurality of banks. The banks each have storage capacity that allows image data corresponding to one frame to be written to the bank. The frame memory 243 is formed, for example, of an SDRAM (synchronous dynamic random access memory).

The image processing section 245 performs image processing on the image data developed in the frame memory 243, for example, resolution conversion or resizing, distortion correction, shape correction, digital zooming, and image color tone and brightness adjustment.

The image processing section 245 converts an input frame frequency of the vertical sync signal into a drawing frequency and generates a vertical sync signal having the drawing frequency. The generated vertical sync signal is called an output sync signal. The image processing section 245 outputs the generated output sync signal to the light modulator driver 222.

The controller 250 includes a memory 251 and the processor 253.

The memory 251 is a storage device that stores a program executed by the processor 253 and data processed by the processor 253 in a nonvolatile manner. The memory 251 is formed of a magnetic storage device, a semiconductor storage device, such as a flash ROM (read only memory), or any other type of nonvolatile storage device. The memory 251 may include a RAM (random access memory) that forms a work area for the processor 253. The memory 251 stores data to be processed by the controller 250 and a control program executed by the processor 253.

The processor 253 may be formed of a single processor, or a plurality of processors may function as the processor 253. The processor 253 executes the control program to control each portion of the projector 200. For example, the processor 253 outputs an instruction to perform image processing corresponding to operation accepted by the operation section 231 or the remote control 5 and parameters used in the image processing to the image processing section 245. The parameters include, for example, a geometric correction parameter for correcting geometric distortion of an image to be projected on the projection surface PS. The processor 253 further controls the light source driver 221 to control the operation of turning on and off the light source section 211 and adjust the luminance of the light from the light source section 211.

The processor 253 of the controller 250 carries out the processes below by executing the control program stored in the memory 251. The processes carried out by the processor 253 will be described with reference to FIGS. 1 and 3. FIG. 3 is a plan view showing an example of a reference plane ST1 and the projection surface PS.

The processor 253 detects the distance L. The processor 253, for example, acquires the distance LA from the distance sensor 242 and calculates the distance L based on the distance LA. The distance L represents the distance between the reference plane ST1 and the projection surface PS, as shown in FIG. 3.

Specifically, the processor 253 calculates the first distance L1, the second distance L2, and the third distance L3. The first distance L1 represents the distance L between the reference plane ST1 and the first portions Q1 of the projection surface PS, as shown in FIG. 3. The second distance L2 represents the distance L between the reference plane ST1 and the second portion Q2 of the projection surface PS. The third distance L3 represents the distance L between the reference plane ST1 and the third portions Q3 of the projection surface PS.

The processor 253 projects the image light PL in the first visual aspect AP1 according to the first distance L1 onto the first portions Q1. The first visual aspect AP1 represents, for example, the first color CL1. The first color CL1 is, for example, black, as shown in FIG. 1.

The processor 253 projects the image light PL in the second visual aspect AP2 according to the second distance L2 onto the second portion Q2. The second visual aspect AP2 represents, for example, the second color CL2. The second color CL2 is, for example, white, as shown in FIG. 1.

The processor 253 projects the image light PL in the third visual aspect AP3 based on the first visual aspect AP1 and the second visual aspect AP2 onto the third portions Q3. The third visual aspect AP3 represents, for example, the intermediate color CL3 between the first color CL1 and the second color CL2. The intermediate color CL3 is, for example, gray, as shown in FIG. 1. The luminance value B3 of the intermediate color CL3 corresponding to the third distance L3 is expressed, for example, by Expression (2) described above, as described with reference to FIG. 1.

The present embodiment is described with reference to the case where the first color CL1 is black and the second color CL2 is white, but not necessarily. For example, the first color CL1 may be a chromatic color, and the second color CL2 may be a chromatic color different from the first color CL1. When the R, G, and B components of the first color CL1 are (R1, G1, B1) and the R, G, and B components of the second color CL2 are (R2, G2, B2), the intermediate color CL3 is expressed, for example, by Expressions (3) to (5) below.

$$R3 = ((L3 - L1) \times R2 + (L2 - L3) \times R1)/(L2 - L1) \quad (3)$$

$$G3 = ((L3 - L1) \times G2 + (L2 - L3) \times G1)/(L2 - L1) \quad (4)$$

$$B3 = ((L3 - L1) \times B2 + (L2 - L3) \times B1)/(L2 - L1) \quad (5)$$

In the expressions, the components (R3, G3, B3) denote the components R, G, and B of the intermediate color CL3.

The processor 253 receives input of information that specifies the first visual aspect AP1 and the second visual aspect AP2 from the remote control 5.

In the present embodiment, the processor 253 receives input of information that specifies the first color CL1 and the second color CL2 from the remote control 5 via the display visual aspect setting screen 300.

The display visual aspect setting screen 300 will be described with reference to FIG. 4.

The reference plane ST1 is, for example, a planar plane perpendicular to the projection axis LC of the projector 200. The projector 200 is disposed in a position shifted in the negative direction of the axis Y from the projection surface PS. The projection surface PS is disposed symmetrically with respect to the projection axis LC.

The reference plane ST1 is a planar plane perpendicular to the projection axis LC at the positive end of the projector 200 in the axis-Y direction.

The projection axis LC represents the center axis of a projection range PA of the projection light. The projection range PA is, for example, a range that spreads over a spread angle θ around the projection axis LC.

In a case where the reference plane ST1 is not distinguished from a reference plane ST2 shown in FIG. 8, the two reference planes are each referred to as a reference plane ST in some cases in the following description.

The present embodiment will be described with reference to the case where the reference plane ST1 is a planar plane perpendicular to the projection axis LC at the positive end of the projector 200 in the axis-Y direction, but not necessarily. The reference plane ST1 only needs to be a planar plane perpendicular to the projection axis LC. The reference plane ST1 may instead, for example, be a planar plane perpendicular to the projection axis LC at the center of the projector 200 in the axis-Y direction.

The reference plane ST only needs to be a plane that intersects with the projection axis LC of the projector 200. A case where the reference plane is a curved plane will be described with reference to FIG. 8.

The projection surface PS forms a surface of each of the first object BJ1 to the sixth object BJ6 that is the surface facing in the negative direction of the axis Y.

The first object BJ1 is formed of the first member BJ11 and the second member BJ12. The first portions Q1 correspond to portions of the first member BJ11 and the second member BJ12 that are the end portions in the negative direction of the axis Y. The second portion Q2 corresponds to a portion of each of the first member BJ11 and the second member BJ12 that is the end portion in the positive direction of the axis Y.

The third portions Q3 correspond to surfaces of the third object BJ3 and the fourth object BJ4 that are the surfaces facing in the negative direction of the axis Y.

Figure 3:
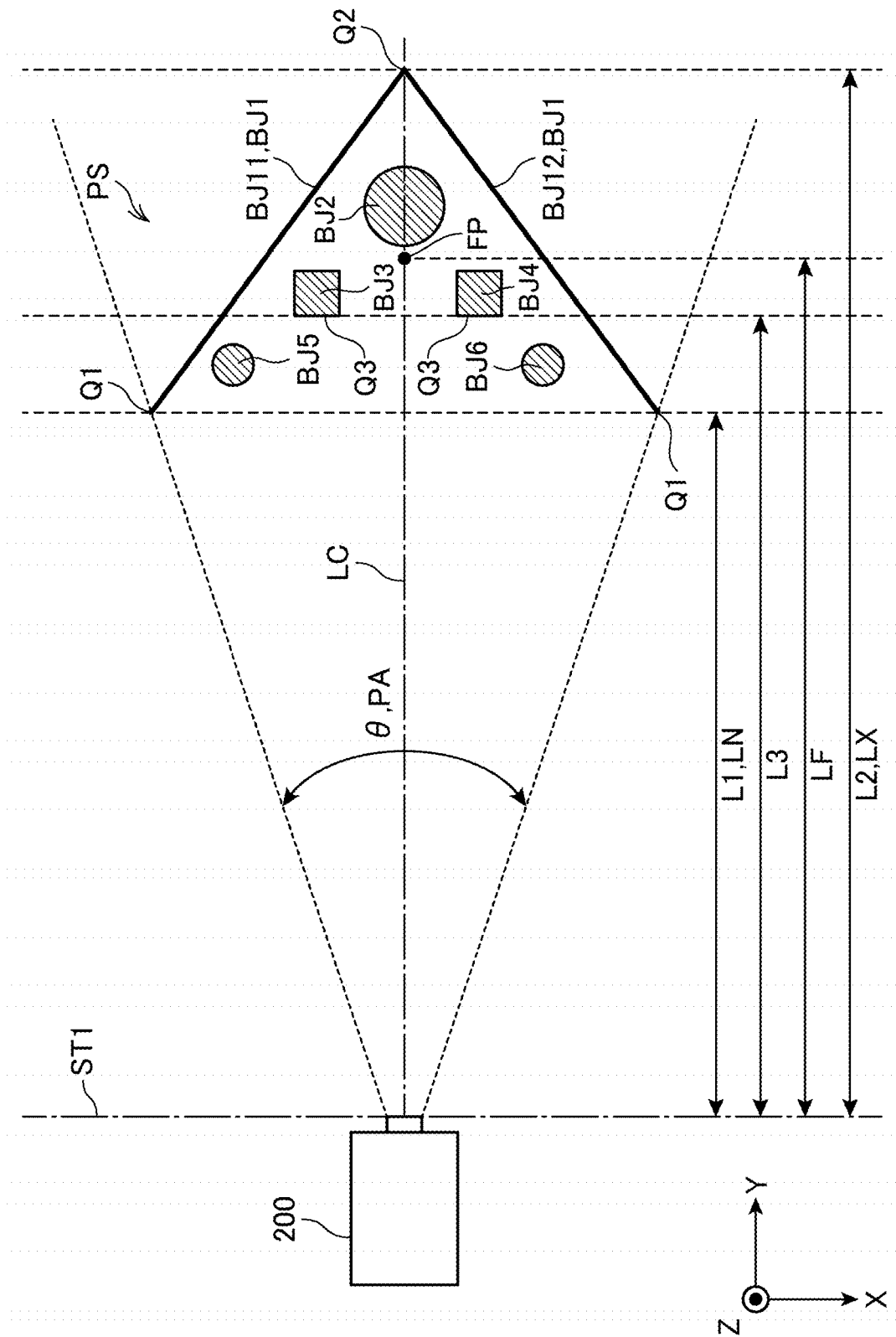
FIG. 3 is a plan view showing an example of a reference plane and a projection surface.

The first distance L1 represents the distance L between the reference plane ST1 and the first portions Q1 of the projection surface PS, as shown in FIG. 3. In other words, the first distance L1 corresponds to the shortest distance LN between the reference plane ST1 and the projection surface PS. The second distance L2 represents the distance L between the reference plane ST1 and the second portion Q2 of the projection surface PS. In other words, the second distance L2 corresponds to the longest distance LX between the reference plane ST1 and the projection surface PS. The third distance L3 represents the distance L between the reference plane ST1 and the third portions Q3 of the projection surface PS.

A focal length LF represents the distance between the reference plane ST1 and a focal point FP of the projector 200. The first distance L1 is shorter than the focal length LF, and the second distance L2 is longer than the focal length LF.

An image in focus can therefore be projected on the projection surface PS when the distance L satisfies Expression (6) below.

$$(LF - FR/2) \leq L \leq (LF + FR/2) \quad (6)$$

A depth of focus FR represents the depth of focus FR of the projector 200.

Therefore, when the projection surface PS satisfies Expression (6) described above, an image in focus can be projected on the projection surface PS. An image in focus can therefore be projected on at least some of the areas of the projection surface PS.

When the first distance L1 is greater than or equal to (LF—FR/2) and the second distance L2 is smaller than or equal to (LF+FR/2), an image in focus can be projected over the entire area of the projection surface PS.

FIG. 4 is a screen diagram showing an example of the display visual aspect setting screen 300. The display visual aspect setting screen 300 is displayed on the LCD of the touch panel 51 of the remote control 5 in accordance with an instruction from the controller 250. The display visual aspect setting screen 300 is a screen via which the display visual aspect of a projection image to be displayed on the projection surface PS is set based on the user's operation. The display visual aspect setting screen 300 is used when the projection image shown in FIG. 1 is displayed on the projection surface PS shown in FIGS. 1 and 3 and corresponds to an example of a screen via which the display visual aspect of the projection image is set.

The display visual aspect setting screen 300 displays a setting result display section CS, a visual aspect selection section CP, a first position selection mark NM, and a second position selection mark FM, as shown in FIG. 4. The setting result display section CS includes a first setting result display section CSA, a second setting result display section CSN, and a third setting result display section CSF.

The first setting result display section CSA displays the visual aspect of the image light PL to be projected on the projection surface PS within the range in which the distance L is longer than or equal to the first distance L1 but shorter than or equal to the second distance L2. In FIG. 4, the first setting result display section CSA displays the color of the image light PL to be projected on the projection surface PS within the range in which the distance L is longer than or equal to the first distance L1 but shorter than or equal to the second distance L2.

The second setting result display section CSN displays the visual aspect of the image light PL to be projected on the projection surface PS the distance L to which is shorter than the first distance L1. The second setting result display section CSN is set in the first visual aspect AP1. In FIG. 4, the second setting result display section CSN displays the color of the image light PL to be projected on the projection surface PS the distance L to which is shorter than the first distance L1, that is, black, which is the first color CL1 in FIG. 4.

The third setting result display section CSF displays the visual aspect of the image light PL to be projected on the projection surface PS the distance L to which is longer than the second distance L2. The third setting result display section CSF is set in the second visual aspect AP2. In FIG. 4, the third setting result display section CSF displays the color of the image light PL to be projected on the projection surface PS the distance L to which is longer than the second distance L2, that is, white, which is the second color CL2 in FIG. 4.

The first position selection mark NM and the second position selection mark FM are each displayed in a selectable manner based on the user's operation.

The first position selection mark NM is selected by the user when the user sets the color of the image light PL on the projection surface PS corresponding to the first distance L1. The user selects the first position selection mark NM, for example, by touching the first position selection mark NM.

The second position selection mark FM is selected by the user when the user sets the color of the image light PL on the projection surface PS corresponding to the second distance L2. The user selects the second position selection mark FM, for example, by touching the second position selection mark FM.

FIG. 4 shows the state in which the first position selection mark NM has been selected. A first selection mark SM1 displayed around the first position selection mark NM indicates that the first position selection mark NM has been selected. When the second position selection mark FM has been selected, the first selection mark SM1 is displayed around the second position selection mark FM. The first selection mark SM1 highlights the selected first position selection mark NM or second position selection mark FM.

The visual aspect selection section CP is selected by the user when the user sets the visual aspect of the image light PL on the projection surface PS corresponding to the first distance L1 or the visual aspect of the image light PL on the projection surface PS corresponding to the second distance L2. In FIG. 4, the visual aspect selection section CP is selected by the user when the user sets the color of the image light PL on the projection surface PS corresponding to the first distance L1 or the color of the image light PL on the projection surface PS corresponding to the second distance L2.

The visual aspect selection section CP includes visual aspect display sections C1 to C11. The visual aspect selection section C1 to the visual aspect selection section C9 and the visual aspect selection section C11 are selected by the user when the user sets the color of the image light PL on the projection surface PS corresponding to the first distance L1 or the color of the image light PL on the projection surface PS corresponding to the second distance L2. The visual aspect display section C10 will be described with reference to the display visual aspect setting screen 500 shown in FIG. 6.

The visual aspect display section C1 to the visual aspect display section C8 show chromatic colors, such as red, green, and blue, the visual aspect display section C9 shows black, and the visual aspect display section C11 shows white.

FIG. 4 shows the state in which the visual aspect display section C9 has been selected. A second selection mark SM2 displayed around the visual aspect display section C9 indicates that the visual aspect display section C9 has been selected. That is, the selected visual aspect is highlighted. The user selects the visual aspect display section C9, for example, by touching the visual aspect display section C9.

The color of the image light PL on the projection surface PS corresponding to the first distance L1 can be set black, which is the first color CL1, by touching the first position selection mark NM to select the first position selection mark NM and then touching the visual aspect display section C9 of the visual aspect selection section CP to select the visual aspect display section C9, as shown in FIG. 4. The color of the image light PL on the projection surface PS corresponding to the second distance L2 can be set white, which is the second color CL2, by touching the second position selection mark FM to select the second position selection mark FM and then touching the visual aspect display section C11 of the visual aspect selection section CP to select the visual aspect display section C11.

As a result, black, which is the first color CL1, is set at a left end portion of the first setting result display section CSA, white, which is the second color CL2, is set at a right end portion of the first setting result display section CSA, and the middle color CL3 is displayed at a central portion of the first setting result display section CSA.

The second setting result display section CSN is set black, which is the first color CL1, and the third setting result display section CSF is set white, which is the second color CL2.

As described with reference to FIG. 4, the color of the image light PL on the projection surface PS can be set by setting the color of the image light PL on the projection surface PS corresponding to the first distance L1 and the color of the image light PL on the projection surface PS corresponding to the second distance L2, as shown in the setting result display section CS. As a result, a projection image having high degree of freedom can be displayed on the projection surface PS, as described with reference to FIG. 1.

In FIG. 4, the description has been made with reference to the case where the color of the image light PL on the projection surface PS corresponding to the first distance L1 is set black, which is the first color CL1, and the color of the image light PL on the projection surface PS corresponding to the second distance L2 is set white, which is the second color CL2, but not necessarily. At least one of the color of the image light PL on the projection surface PS corresponding to the first distance L1 and the color of the image light PL on the projection surface PS corresponding to the second distance L2 may be set to be a chromatic color.

For example, when the color of the image light PL on the projection surface PS corresponding to the first distance L1 is set red and the color of the image light PL on the projection surface PS corresponding to the second distance L2 is set green, the colors corresponding to the line segment that connects the point corresponding to red and the point corresponding to green in the RGB color space are set as the colors of the image light PL on the projection surface PS. A colorful projection image can therefore be displayed on the projection surface PS.

FIG. 5 is a screen view showing an example of the display visual aspect setting screen 400.

The display visual aspect setting screen 400 differs from the display visual aspect setting screen 300 shown in FIG. in that the former displays the intermediate position selection mark MM. The following description will primarily focus on the difference from the display visual aspect setting screen 300.

The display visual aspect setting screen 400 displays the setting result display section CS, the visual aspect selection section CP, the first position selection mark NM, the second position selection mark FM, and an intermediate position selection mark MM.

The setting result display section CS includes the first setting result display section CSA, the second setting result display section CSN, and the third setting result display section CSF.

The visual aspect selection section CP includes the visual aspect display sections C1 to C11.

The intermediate position selection mark MM is displayed based on the user's operation when the user sets the color of the image light PL on the projection surface PS corresponding to an intermediate distance LM. The intermediate distance LM is longer than the first distance L1 but shorter than the second distance L2. For example, the user can display the intermediate position selection mark MM by touching the position corresponding to the intermediate distance LM in the first setting result display section CSA.

The intermediate position selection mark MM is selected by the user when the user sets the color of the image light PL on the projection surface PS corresponding to the intermediate distance LM. The user selects the intermediate position selection mark MM, for example, by touching the intermediate position selection mark MM. When the intermediate position selection mark MM has been selected, the first selection mark SM1 is displayed around the intermediate position selection mark MM, as shown in FIG. 5.

The user can set the color of the image light PL on the projection surface PS corresponding to the intermediate distance LM by selecting any of the visual aspect display sections C1 to C11 of the visual aspect selection section CP. For example, the user touches the visual aspect display section C9 to select the visual aspect display section C9. As a result, the second selection mark SM2 is displayed around the visual aspect display section C9. The second selection mark SM2 indicates that the visual aspect display section C9 has been selected.

As a result, black, which is the first color CL1, is set in the left end portion of the first setting result display section CSA, black, which is the first color CL1, is set in a position on the first setting result display section CSA that is the position corresponding to the intermediate distance LM, and white, which is the second color CL2, is set in the right end portion of the first setting result display section CSA. Further, in the first setting result display section CSA, black, which is the first color CL1, is displayed in the portion between the left end portion and the position corresponding to the intermediate distance LM, and the intermediate color CL3 is displayed in the portion between the position corresponding to the intermediate distance LM and the right end portion.

As described with reference to FIG. 5, the color of the image light PL on the projection surface PS can be set by setting the color of the image light PL on the projection surface PS corresponding to the first distance L1, the color of the image light PL on the projection surface PS corresponding to the intermediate distance LM, and the color of the image light PL on the projection surface PS corresponding to the second distance L2, as shown in the setting result display section CS. As a result, a projection image having a high degree of freedom can be displayed on the projection surface PS.

In FIG. 5, the description has been made with reference to the case where the color of the image light PL on the projection surface PS corresponding to the intermediate distance LM is set black, which is the first color CL1, but not necessarily. The color of the image light PL on the projection surface PS corresponding to the intermediate distance LM may be the color corresponding to any of the visual aspect display sections C1 to C11.

For example, when the color of the image light PL on the projection surface PS corresponding to the intermediate distance LM is set white, which is the second color CL2, the intermediate color CL3 is displayed in the portion of the first setting result display section CSA between the left end portion and the position corresponding to the intermediate distance LM, and white, which is the second color CL2, is displayed in the portion of the first setting result display section CSA between the position corresponding to the intermediate distance LM and the right end portion.

When the color of the image light PL on the projection surface PS corresponding to the intermediate distance LM is set red, an intermediate color between black, which is the first color CL1, and red is displayed in the portion of the first setting result display section CSA between the left end portion and the position corresponding to the intermediate distance LM, and an intermediate color between red and white, which is the second color CL2, is displayed in the portion of the first setting result display section CSA between the position corresponding to the intermediate distance LM and the right end portion.

The projection surface PS from the position corresponding to the first distance L1 to the position corresponding to the second distance L2 is divided into two segments: the projection surface PS from the position corresponding to the first distance L1 to the position corresponding to the intermediate distance LM; and the projection surface PS from the position corresponding to the intermediate distance LM to the position corresponding to the second distance L2. In the position corresponding to the intermediate distance LM, the color of the image light PL in the two segments coincides with the color of the image light PL on the projection surface PS corresponding to the intermediate distance LM. The color continuously changes according to the distance L on the projection surface PS from the position corresponding to the first distance L1 to the position corresponding to the middle distance LM, and the color continuously changes according to the distance L on the projection surface PS from the position corresponding to the intermediate distance LM to the position corresponding to the second distance L2. Therefore, since the color of the image light PL projected on the projection surface PS continuously changes, a natural projection image can be displayed on the projection surface PS.

FIG. 6 is a screen view showing an example of the display visual aspect setting screen 500.

The display visual aspect setting screen 500 differs from the display visual aspect setting screen 300 shown in FIG. 4 in that the former displays a range display mark RM and a range selection mark CM. The following description will primarily focus on the difference from the display visual aspect setting screen 300.

The display visual aspect setting screen 500 displays the setting result display section CS, the visual aspect selection section CP, the first position selection mark NM, the second position selection mark FM, the range display mark RM, and the range selection mark CM.

The setting result display section CS includes the first setting result display section CSA, the second setting result display section CSN, and the third setting result display section CSF.

The visual aspect selection section CP includes the visual aspect display sections C1 to C11.

The range display mark RM and the range selection mark CM are displayed based on the user's operation when the user sets the color of the image light PL on the projection surface PS corresponding to the portion from the position corresponding to a first intermediate distance LM1 to the position corresponding to a second intermediate distance LM2. The second intermediate distance LM2 is longer than the first intermediate distance LM1. The first intermediate distance LM1 is longer than the first distance L1, and the second intermediate distance LM2 is shorter than the second distance L2. A fourth distance L4 is longer than or equal to the first intermediate distance LM1 but shorter than or equal to the second intermediate distance LM2. A portion of the projection surface PS that is the portion corresponding to the fourth distance L4 is a fourth portion Q4, which is not shown.

For example, the user displays the range display mark RM and the range selection mark CM by touching the position corresponding to the first intermediate distance LM1 and the position corresponding to the second intermediate distance LM2 at the same time in the first setting result display section CSA.

The range display mark RM indicates the range from the position corresponding to the first intermediate distance LM1 to the position corresponding to the second intermediate distance LM2 in the first setting result display area CSA. The range display mark RM includes a first range display mark RM1 and a second range display mark RM2. The first range display mark RM1 indicates the position corresponding to the first intermediate distance LM1 in the first setting result display section CSA, and the second range display mark RM2 indicates the position corresponding to the second intermediate distance LM2 in the first setting result display section CSA.

The range selection mark CM is selected by the user when the user sets the visual aspect of the image light PL on the projection surface PS corresponding to the range from the position corresponding to the first intermediate distance LM1 to the position corresponding to the second intermediate distance LM2. The user selects the range selection mark CM, for example, by touching the range selection mark CM. When the range selection mark CM is selected, a third selection mark SM3 is displayed around the range selection mark CM, as shown in FIG. 6.

The user can set the color of the visual aspect of the projection surface PS corresponding to the intermediate distance LM by selecting any of the visual aspect display sections C1 to C11 of the visual aspect selection section CP. The user, for example, touches the visual aspect display section C10 to select the visual aspect display section C10. As a result, the second selection mark SM2 is displayed around the visual aspect display section C10. The second selection mark SM2 indicates that the visual aspect display section C10 has been selected.

The visual aspect display section C10 shows a pattern image. The pattern image corresponds to an example of a fourth visual aspect AP4. The fourth visual aspect AP4 shows the visual aspect of the image light PL projected on the fourth portion Q4.

As a result, black, which is the first color CL1, is set in the left end portion of the first setting result display section CSA, white, which is the second color CL2, is set in the right end portion of the first setting result display section CSA, and the pattern image is set in the position corresponding to the range from the position corresponding to the first intermediate distance LM1 to the position corresponding to the second intermediate distance LM2 in the first setting result display section CSA. Further, the intermediate color CL3 is displayed in the portion between the left end portion of the first setting result display section CSA and the position corresponding to the first intermediate distance LM1 and the portion between the position corresponding to the second intermediate distance LM2 and the right end portion, and the pattern image is displayed in the portion between the position corresponding to the first intermediate distance LM1 and the position corresponding to the second intermediate distance LM2.

In the present embodiment, the fourth distance L4 is longer than the first intermediate distance LM1 but shorter than the second intermediate distance LM2.

For example, when the fourth distance L4 is equal to the third distance L3, the pattern image is displayed on the third projection surface PS3 and the fourth projection surface PS4 shown in FIG. 1. The third projection surface PS3 and the fourth projection surface PS4 are parallel to the plane X-Z, so that the pattern image is displayed without being distorted. The pattern image can therefore be clearly displayed.

As described with reference to FIG. 6, the color of the image light PL on the projection surface PS can be set by setting the color of the image light PL on the projection surface PS corresponding to the first distance L1, the color of the image light PL on the projection surface PS corresponding to the distances from the first intermediate distance LM1 to the second intermediate distance LM2, and the color of the image light PL on the projection surface PS corresponding to the second distance L2, as shown in the setting result display section CS. As a result, a projection image having a high degree of freedom can be displayed on the projection surface PS.

In FIG. 6, the description has been made with reference to the case where the pattern image is displayed in a portion of the projection surface PS that is the portion between the position corresponding to the first intermediate distance LM1 and the position corresponding to the second intermediate distance LM2, but not necessarily. The image light PL in the fourth visual aspect AP4, which differs from the first visual aspect AP1, the second visual aspect AP2, and the third visual aspect AP3, only needs to be projected in a portion of the projection surface PS that is the portion between the position corresponding to the first intermediate distance LM1 and the position corresponding to the second intermediate distance LM2. Instead, for example, a visual aspect may be selected from the visual aspect display sections C1 to C8. In this case, the selected color is displayed as the fourth visual aspect AP4.

For example, the fourth visual aspect AP4 may be a still image, such as an image of a landscape or an image of a person. Still instead, the fourth visual aspect AP4 may be motion images.

A projection image having a high degree of freedom can therefore be displayed on the projection surface PS.

Figure 7:
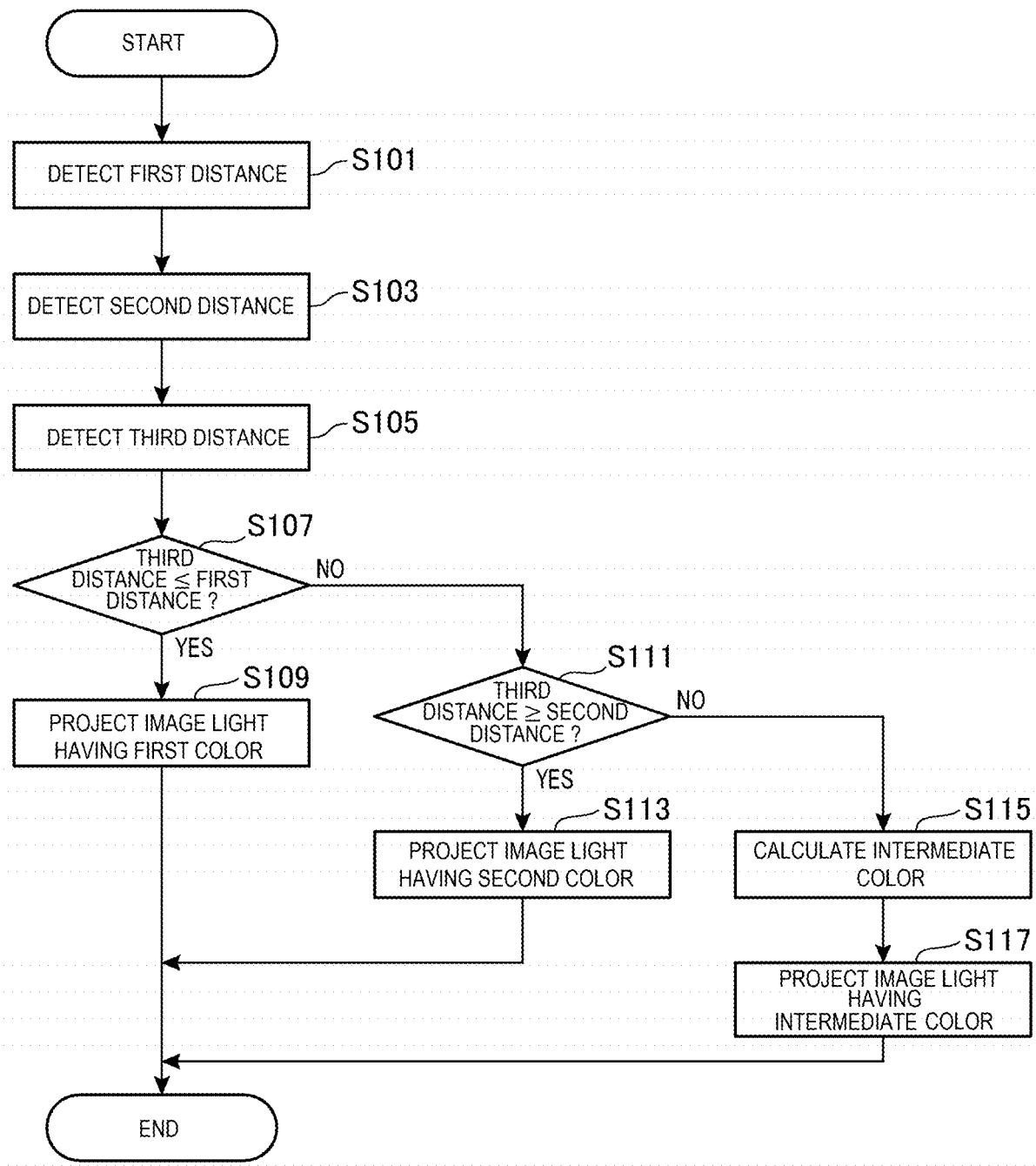
FIG. 7 is a flowchart showing an example of processes carried out by a controller.

FIG. 7 is a flowchart showing an example of processes carried out by the controller 250. In FIG. 7, a description will be made of the case where the image light PL is projected on the projection surface PS based on the setting result display CS set via the display visual aspect setting screen 300 shown in FIG. 4.

First, in step S101, the controller 250 acquires the distance LA corresponding to the first portions Q1 from the distance sensor 242 and detects the first distance L1 based on the distance LA. The first distance L1 represents the distance between the reference plane ST1 and the first portions Q1 of the projection surface PS. The controller 250 then projects the image light PL having the first color CL1 onto the first sections Q1.

Thereafter, in step S103, the controller 250 acquires the distance LA corresponding to the second portion Q2 from the distance sensor 242 and detects the second distance L2 based on the distance LA. The second distance L2 represents the distance between the reference plane ST1 and the second portion Q2 of the projection surface PS. The controller 250 then projects the image light PL having the second color CL2 onto the second portion Q2.

Thereafter, in step S105, the controller 250 acquires the distance LA corresponding to the third portion Q3 from the distance sensor 242 and detects the third distance L3 based on the distance LA. The third distance L3 represents the distance between the reference plane ST1 and the third portion Q3 of the projection surface PS.

Thereafter, in step S107, the controller 250 evaluates whether or not the third distance L3 is shorter than or equal to the first distance L1.

When the controller 250 determines that the third distance L3 is shorter than or equal to the first distance L1 (YES in step S107), the controller 250 proceeds to the process in step S109.

The controller 250 then projects the image light PL having the first color CL1 onto the third portions Q3. The processes are then terminated.

When the controller 250 determines that the third distance L3 is not shorter than or equal to the first distance L1 (NO in step S107), the controller 250 proceeds to the process in step S111.

Thereafter, in step S111, the controller 250 evaluates whether or not the third distance L3 is longer than or equal to the second distance L2.

When the controller 250 determines that the third distance L3 is longer than or equal to the second distance L2 (YES in step S111), the controller 250 proceeds to the process in step S113.

Thereafter, in step S113, the controller 250 projects the image light PL having the second color CL2 onto the third portions Q3. The processes are then terminated.

When the controller 250 determines that the third distance L3 is not longer than or equal to the second distance L2 (NO in step S111), the controller 250 proceeds to the process in step S115.

Thereafter, in step S115, the controller 250 calculates the intermediate color CL3 between the first color CL1 and the second color CL2 by using Expressions (3) to (5) described above.

Thereafter, in step S117, the controller 250 projects the image light PL having the intermediate color CL3 onto the third portions Q3. The processes are then terminated.

As described above, the image light PL having the first color CL1 is projected on the first portions Q1, the image light PL having the second color CL2 is projected on the second portion Q2, and when the third distance L3 is longer than the first distance L1 but shorter than the second distance L2, the image light PL having the intermediate color CL3 is projected on the third portions Q3. A projection image having a high degree of freedom can therefore be displayed by using simple settings.

Figure 8:
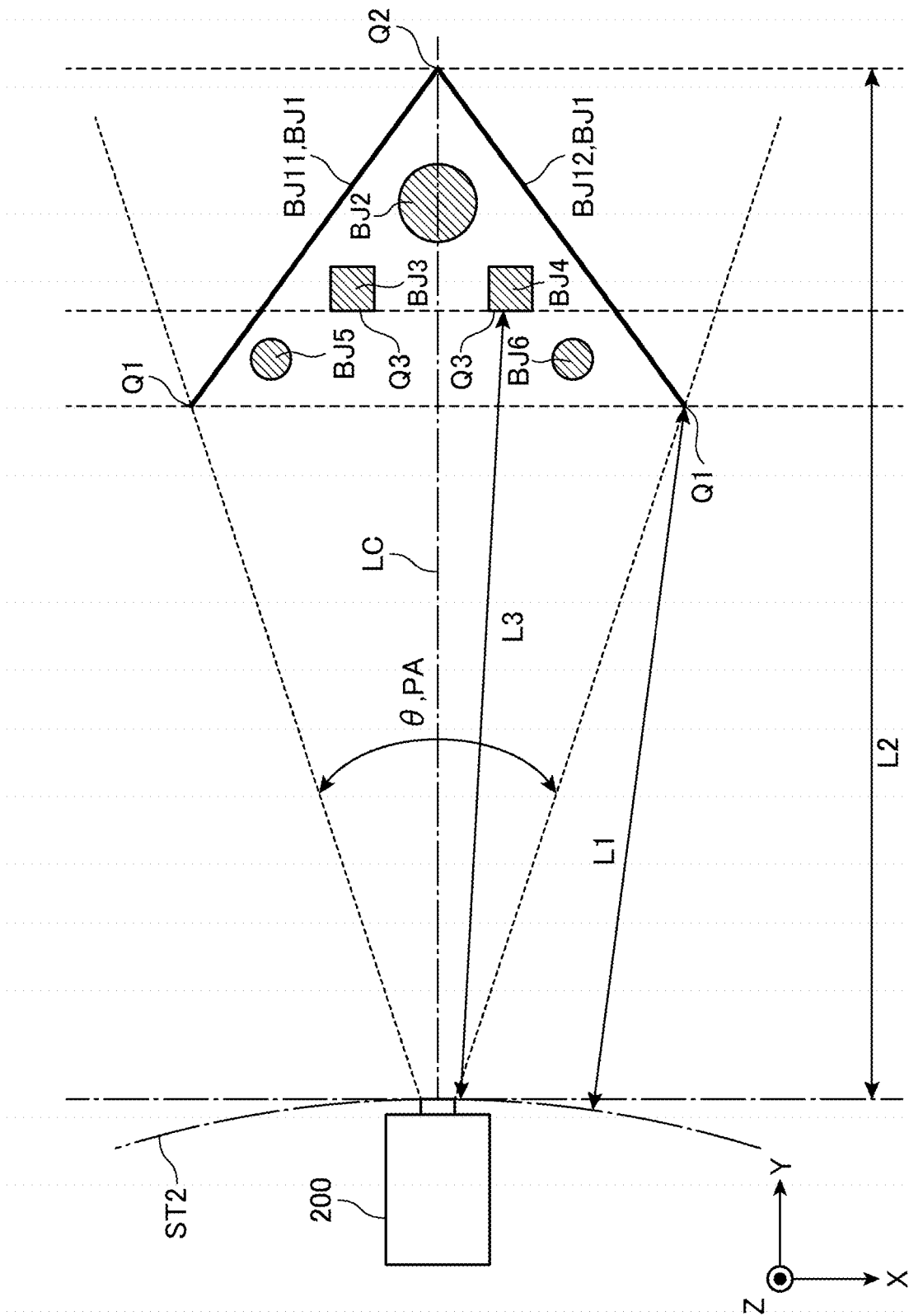
FIG. 8 is a plan view showing another example of the reference plane.

FIG. 8 is a plan view showing another example of the reference plane ST2.

FIG. 8 differs from FIG. 3 in that the reference plane ST2 is a curved surface. The difference from FIG. 3 will be primarily described below.

The reference plane ST2 is a curved surface perpendicular to the projection axis LC at the positive end of the projector 200 in the axis-Y direction. Specifically, the reference plane ST2 is, for example, part of the circumferential surface of a cylinder having a center axis extending along the axis-Z direction.

In this case, the first distance L1 is equal to the length of a line segment that passes through one of the first portions Q1 and is perpendicular to the reference plane ST2, as shown in FIG. 8. The third distance L3 is equal to the length of a line segment that passes through one of the third portions Q3 and is perpendicular to the reference plane ST2, as shown in FIG. 8.

The first distance L1 shown in FIG. 8 is longer than the first distance L1 shown in FIG. 3, and the third distance L3 shown in FIG. 8 is longer than the third distance L3 shown in FIG. 3.

Since the second portion Q2 is located on the projection axis LC, the second distance L2 shown in FIG. 8 is equal to the second distance L2 shown in FIG. 3.

The distance L between the projection surface PS and the reference plane ST2 thus increases as the position on the projection surface PS is separate away from the projection axis LC.

An image displayed on the projection surface PS therefore differs from the image shown in FIG. 1.

The image displayed on the projection surface PS can be changed, for example, by changing the reference plane ST from the reference plane ST1 shown in FIG. 3 to the reference plane ST2 shown in FIG. 8, as described with reference to FIG. 8. A projection image having a high degree of freedom can therefore be displayed on the projection surface PS.

In FIG. 8, a description has been made with reference to the case where the reference plane ST2 is a curved surface perpendicular to the projection axis LC at the positive end of the projector 200 in the axis-Y direction, but not necessarily. The reference plane ST2 only needs to be a curved surface perpendicular to the projection axis LC. The reference plane ST2 may instead, for example, be a curved surface perpendicular to the projection axis LC at the center of the projector 200 in the axis-Y direction.

The reference plane ST2 may still instead be a curved surface that intersects with the projection axis LC of the projector 200.

In FIG. 8, the description has been made with reference to the case where the reference plane ST2 is part of the circumferential surface of a cylinder, but not necessarily. The reference plane ST2 only needs to be a curved surface that intersects with the projection axis LC of the projector 200. For example, the reference plane ST2 may be part of a spherical surface.

The projection method according to the present embodiment includes detecting the first distance L1 between the projector 200 and the first portions Q1 of the projection surface PS, detecting the second distance L2 between the projector 200 and the second portion Q2 of the projection surface PS, detecting the third distance L3 between the projector 200 and the third portions Q3 of the projection surface PS, causing the projector 200 to project the image light PL in the first visual aspect AP1 according to the first distance L1 onto the first portions Q1, causing the projector 200 to project the image light PL in the second visual aspect AP2 according to the second distance L2 onto the second portion Q2, and causing the projector 200 to project the image light PL in the third visual aspect AP3 based on the first visual aspect AP1 and the second visual aspect AP2 onto the third portions Q3 when the third distance L3 is longer than the first distance L1 but shorter than the second distance L2, as described above with reference to FIGS. 1 to 8.

That is, the image light PL in the first visual aspect AP1 according to the first distance L1 is projected onto the first portions Q1, the image light PL in the second visual aspect AP2 according to the second distance L2 is projected onto the second portion Q2, and when the third distance L3 is longer than the first distance L1 but shorter than the second distance L2, the image light PL in the third visual aspect AP3 based on the first visual aspect AP1 and the second visual aspect AP2 is projected onto the third portions Q3.

The image light PL in the third visual aspect AP3 based on the first visual aspect AP1 and the second visual aspect AP2 can therefore be projected onto the third portions Q3. A projection image having a high degree of freedom can therefore be displayed on the projection surface PS.

The first visual aspect AP1 is the first color CL1, the second visual aspect AP2 is the second color CL2, and the third visual aspect AP3 is the intermediate color CL3 between the first color CL1 and the second color CL2.

The image light PL having the intermediate color CL3 between the first color CL1 and the second color CL2 can therefore be projected on the third portions Q3. A projection image having a high degree of freedom can therefore be displayed on the projection surface PS.

The first distance L1 is the distance between the first portions Q1 and the reference plane ST, which intersects with the projection axis LC of the projector 200, and the second distance L2 is the distance between the second portion Q2 and the reference plane ST.

The first distance L1 and the second distance L2 can therefore be properly determined. A projection image having a high degree of freedom can therefore be displayed on the projection surface PS.

The first distance L1 is the distance between the first portions Q1 and the reference plane ST1, which is a planar surface perpendicular to the projection axis LC of the projector 200, and the second distance L2 is the distance between the second portion Q2 and the reference plane ST1.

The first distance L1 and the second distance L2 can therefore be readily calculated from the distance LA detected with the distance sensor 242.

The first distance L1 is shorter than the focal length LF of the projector 200, and the second distance L2 is longer than the focal length LF.

The focal distance LF therefore falls within the range from the first distance L1 to the second distance L2, whereby an image in focus can be projected on the projection surface PS. The quality of the image displayed on the projection surface PS can therefore be improved.

The projection method according to the present embodiment further includes accepting input of information that specifies at least one of the first visual aspect AP1 and the second visual aspect AP2.

The user can therefore set at least one of the first visual aspect AP1 and the second visual aspect AP2. A projection image having a high degree of freedom can therefore be displayed on the projection surface PS in accordance with the user's preference.

The projection method according to the present embodiment further includes displaying the image light PL in the fourth visual aspect AP4 on the fourth portion Q4 of the projection surface PS, which is the portion different from the first portions Q1, the second portion Q2, and the third portions Q3.

The degree of freedom of the projection image displayed on the projection surface PS can therefore be increased.

The image light PL in the fourth visual aspect AP4 is a pattern image.

Therefore, since the pattern image is displayed on the fourth portion Q4, the degree of freedom of the projection image displayed on the projection surface PS can be increased.

The projection method according to the present embodiment further includes projecting the image light PL in the first visual aspect AP1 onto a portion of the projection surface PS that is a portion closer to the projector 200 than the position corresponding to the first distance L1.

The display visual aspect of the portion of the projection surface PS that is a portion closer to the projector 200 than the position corresponding to the first distance L1 can therefore be readily determined. The convenience of the user can therefore be improved.

The projection method according to the present embodiment further includes projecting the image light PL in the second visual aspect AP2 onto a portion of the projection surface PS that is a portion farther from the projector 200 than the position corresponding to the second distance L2.

The display visual aspect of the portion of the projection surface PS that is a portion farther from the projector 200 than the position corresponding to the second distance L2 can therefore be readily determined. The convenience of the user can therefore be improved.

The projector 200 according to the present embodiment is a projector including the light source section 211, the light modulator 212, the distance sensor 242, and the controller 250, and the controller 250 detects the first distance L1 between the projector 200 and the first portions Q1 of the projection surface PS by using the distance sensor 242, detects the second distance L2 between the projector 200 and the second portion Q2 of the projection surface PS by using the distance sensor 242, detects the third distance L3 between the projector 200 and the third portions Q3 of the projection surface PS by using the distance sensor 242, projects the image light PL in the first visual aspect AP1 according to the first distance L1 onto the first portions Q1 by using the light source section 211 and the light modulator 212, projects the image light PL in the second visual aspect AP2 according to the second distance L2 onto the second portion Q2 by using the light source section 211 and the light modulator 212, and projects the image light PL in the third visual aspect AP3 based on the first visual aspect AP1 and the second visual aspect AP2 onto the third portions Q3 when the third distance L3 is longer than the first distance L1 but shorter than the second distance L2 by using the light source section 211 and the light modulator 212.

That is, the image light PL in the first visual aspect AP1 according to the first distance L1 is projected on the first portions Q1, the image light PL in the second visual aspect AP2 according to the second distance L2 is projected on the second portion Q2, and when the third distance L3 is longer than the first distance L1 but shorter than the second distance L2, the image light PL in the third visual aspect AP3 based on the first visual aspect AP1 and the second visual aspect AP2 is projected on the third portions Q3.

The image light PL in the third visual aspect AP3 based on the first visual aspect AP1 and the second visual aspect AP2 can therefore be projected on the third portions Q3. A projection image having a high degree of freedom can therefore be displayed on the projection surface PS.

The present embodiment described above is a preferable embodiment. The present disclosure is, however, not limited to the embodiment described above, and a variety of variations are conceivable to the extent that the variations do not depart from the substance of the present disclosure.

In the present embodiment, the description has been made with reference to the case where the first distance L1 corresponds to the shortest distance LN between the reference plane ST1 and the projection surface PS and the second distance L2 corresponds to the longest distance LX between the reference plane ST1 and the projection surface PS, but not necessarily. The first distance L1 only needs to be longer than or equal to the shortest distance LN, and the second distance L2 only needs to be shorter than or equal to the longest distance LX. The first distance L1 and the second distance L2 may be set by the user, for example, via the display visual aspect setting screen 300.

In the present embodiment, the second setting result display section CSN is set in the first visual aspect AP1, and the second setting result display section CSN may be set in a visual aspect different from the first visual aspect AP1. Similarly, in the present embodiment, the third setting result display section CSF is set in the second visual aspect AP2, and the third setting result display section CSF may be set in a visual aspect different from the second visual aspect AP2. At least one of the second setting result display section CSN and the third setting result display section CSF may be omitted.

In the present embodiment, the controller 250 accepts input of information that specifies the first color CL1 and the second color CL2, but not necessarily. The controller 250 only needs to accept at least one of the first visual aspect AP1 and the second visual aspect AP2.

The functional portions shown in FIG. 2 each represent a functional configuration and are each not necessarily implemented in a specific form. That is, hardware corresponding to each of the functional portions is not necessarily implemented, and a single processor that executes a program can, of course, achieve the functions of the plurality of functional portions. Further, part of the functions achieved by software in the embodiment described above may be achieved by hardware, or part of the functions achieved by hardware in the embodiment described above may be achieved by software. In addition, the specific detailed configuration of each of the other portions of the projector 200 can be arbitrarily changed to the extent that the change does not depart from the substance of the present disclosure.

The process units in the flowchart shown in FIG. 7 are process units divided in accordance with the contents of the primary processes for easy understanding of the processes carried out by the controller 250. How to produce the divided process units or the names of the process units shown in the flowchart of FIG. 7 do not limit the embodiment of the present disclosure. The processes carried out by the controller 200 can each be further divided into a larger number of process units in accordance with the content of the process, and each of the process units can further be divided into a large number of processes. Further, the order in which the processes are carried out in the flowchart described above is not limited to that shown in FIG. 7.

The projection method for the projector 200 can be achieved by causing the processor 253 provided in the projector 200 to execute a control program corresponding to the projection method for the projector 200. The control program can also be recorded on a computer readable recording medium. The recording medium can be a magnetic or optical recording medium or a semiconductor memory device. Specific examples of the recording medium may include a flexible disk, an HDD (hard disk drive), a CD-ROM (compact disk read only memory), a DVD (digital versatile disc), a Blu-ray (registered trademark) disc, a magneto-optical disk, a flash memory, and a portable or immobile recording medium, such as a card-shaped recording medium. The recording medium may instead be a RAM, a ROM, an HDD, or any other nonvolatile storage apparatus that is an internal storage apparatus provided in the projector 200. The control program corresponding to the projection method for the projector 200 can be stored, for example, in a server apparatus, and the control program can be downloaded from the server apparatus to the projector 200 to achieve the projection method for the projector 200.

What is claimed is:

1. A projection method comprising:
  detecting a first distance between a projector and a first portion of a projection surface;
  detecting a second distance between the projector and a second portion of the projection surface;
  detecting a third distance between the projector and a third portion of the projection surface;
  projecting image light in a first visual aspect according to the first distance onto the first portion by using the projector;
  projecting image light in a second visual aspect according to the second distance onto the second portion by using the projector;
  projecting image light in a third visual aspect based on the first and second visual aspects onto the third portion by using the projector when the third distance is longer than the first distance but shorter than the second distance; and
  displaying a user interface for accepting input of information that specifies at least one of the first and second visual aspects, wherein:

the first distance is a distance between the first portion and a planar plane perpendicular to a projection axis of the projector, the second distance is a distance between the second portion and the planar plane, the projection axis is a center axis of a projection range of the projector, the first visual aspect is a first color, the second visual aspect is a second color that is different from the first color, and the third visual aspect is an intermediate color between the first color and the second color, and the user interface accepts the input of the information from a user.

2. The projection method according to claim 1, wherein the first distance is shorter than a focal length of the projector, and the second distance is longer than the focal length.

3. The projection method according to claim 1, further comprising displaying the image light in a fourth visual aspect onto a fourth portion of the projection surface, the fourth portion being different from the first, second, and third portions.

4. The projection method according to claim 3, wherein the image light in the fourth visual aspect is a pattern image.

5. The projection method according to claim 1, further comprising projecting the image light in the first visual aspect onto a portion of the projection surface that is a portion closer to the projector than a position corresponding to the first distance.

6. The projection method according to claim 1, further comprising projecting the image light in the second visual aspect onto a portion of the projection surface that is a portion farther from the projector than a position corresponding to the second distance.

7. The projection method according to claim 1, wherein the second portion is on the projection axis.

8. The projection method according to claim 1, wherein the first portion is farther away from the projection axis on the planar plane than the third portion.

9. The projection method according to claim 1, wherein displaying the user interface includes:

displaying a first input field in association with the first distance, the first input field being an input field for inputting the first color, and displaying a second input field in association with the second distance, the second input field being an input field for inputting the second color.

10. A projector comprising:

a light source;

a light modulator that modulates light outputted from the light source;

a distance sensor; and at least one processor configured to detect a first distance between the projector and a first portion of a projection surface by using the distance sensor, detect a second distance between the projector and a second portion of the projection surface by using the distance sensor, detect a third distance between the projector and a third portion of the projection surface by using the distance sensor, project image light in a first visual aspect according to the first distance onto the first portion by using the light source and the light modulator, project image light in a second visual aspect according to the second distance onto the second portion by using the light source and the light modulator, project image light in a third visual aspect based on the first and second visual aspects onto the third portion by using the light source and the light modulator when the third distance is longer than the first distance but shorter than the second distance, and display a user interface for accepting input of information that specifies at least one of the first and second visual aspects, wherein:

the first distance is a distance between the first portion and a planar plane perpendicular to a projection axis of the projector, the second distance is a distance between the second portion and the planar plane, the projection axis is a center axis of a projection range of the projector, the first visual aspect is a first color, the second visual aspect is a second color that is different from the first color, and the third visual aspect is an intermediate color between the first color and the second color, and the user interface accepts the input of the information from a user.

* * * * *